United States Patent
Blandy

(10) Patent No.: US 6,886,094 B1
(45) Date of Patent: Apr. 26, 2005

(54) APPARATUS AND METHOD FOR DETECTING AND HANDLING EXCEPTIONS

(75) Inventor: Geoffrey Owen Blandy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/671,877

(22) Filed: Sep. 28, 2000

(51) Int. Cl.$^7$ .............................................. G06F 9/40
(52) U.S. Cl. ................................. 712/244; 712/233
(58) Field of Search ............................. 712/244, 245, 712/233, 234, 220, 218, 238, 200

(56) References Cited

U.S. PATENT DOCUMENTS

| | | | |
|---|---|---|---|
| 4,435,753 A | 3/1984 | Rizzi ........................... | 364/200 |
| 4,642,764 A | 2/1987 | Auslander et al. ........... | 364/300 |
| 4,782,444 A | 11/1988 | Munshi et al. .............. | 364/300 |
| 4,833,599 A | 5/1989 | Colwell et al. .............. | 364/200 |
| 4,961,141 A | 10/1990 | Hopkins et al. ............. | 364/200 |
| 5,057,837 A | 10/1991 | Colwell et al. ................ | 341/55 |
| 5,448,746 A | 9/1995 | Eickemeyer et al. ......... | 395/800 |
| 5,497,499 A | 3/1996 | Garg et al. .................. | 395/800 |
| 5,504,932 A | 4/1996 | Vassiliadis et al. .......... | 395/800 |
| 5,600,810 A | 2/1997 | Ohkami ...................... | 395/567 |
| 5,613,121 A | 3/1997 | Blainey ....................... | 395/709 |
| 5,627,981 A * | 5/1997 | Adler et al. ................. | 712/235 |
| 5,628,016 A * | 5/1997 | Kukol ......................... | 717/140 |
| 5,634,023 A * | 5/1997 | Adler et al. ................. | 712/244 |
| 5,669,001 A | 9/1997 | Moreno ....................... | 395/706 |
| 5,748,936 A * | 5/1998 | Karp et al. .................. | 712/218 |
| 5,761,470 A | 6/1998 | Yoshida ....................... | 395/386 |
| 5,764,962 A * | 6/1998 | Buzbee ......................... | 703/23 |
| 5,768,510 A * | 6/1998 | Gish ............................ | 709/203 |
| 5,778,219 A * | 7/1998 | Amerson et al. ............ | 712/244 |
| 5,787,302 A | 7/1998 | Hampapuram et al. | 395/800.24 |
| 5,812,850 A | 9/1998 | Wimble ........................ | 395/704 |
| 5,819,058 A | 10/1998 | Miller et al. ................. | 395/386 |
| 5,826,054 A | 10/1998 | Jacobs et al. | |
| 5,828,886 A | 10/1998 | Hayashi ....................... | 395/709 |
| 5,922,065 A | 7/1999 | Hull et al. ..................... | 712/24 |

(Continued)

OTHER PUBLICATIONS

Fitzgerald et al., "Marmot: An Optimizing Compiler for Java", Microsoft Research, Jun. 16, 1999, Technical Report MSR–TR–99–33, pp. 1–29.

(Continued)

*Primary Examiner*—Henry W. H. Tsai
(74) *Attorney, Agent, or Firm*—Duke W. Yee; Volel Emile; Stephen J. Walder, Jr.

(57) ABSTRACT

An apparatus and method are provided for detecting and handling exceptions. Instructions that are executed only when there is an exception pending are qualified by a first predicate register in a predicate register pair. Instructions that are executed only when there is no exception pending are qualified based on a second predicate register in the predicate register pair. When an exception is thrown, a determination is made as to whether or not the instruction that threw the exception is in a try block, or range, of the method that threw the exception. If not, the first predicate register predicated instruction to branch to a return stub for the method is generated. If the instruction that threw the exception is in a try block of the method, the first predicate register predicated instruction to branch to a snippet associated with the method is generated.

21 Claims, 4 Drawing Sheets

U.S. PATENT DOCUMENTS

| | | | | |
|---|---|---|---|---|
| 5,966,537 | A | | 10/1999 | Ravichandran ............. 395/709 |
| 6,009,517 | A | * | 12/1999 | Bak et al. .................... 712/245 |
| 6,018,799 | A | | 1/2000 | Wallace et al. ............. 712/300 |
| 6,035,120 | A | | 3/2000 | Ravichandran ............. 395/705 |
| 6,041,399 | A | * | 3/2000 | Terada et al. ................. 712/24 |
| 6,108,771 | A | | 8/2000 | Gaertner et al. ............ 712/217 |
| 6,110,226 | A | | 8/2000 | Bothner ......................... 717/7 |
| 6,151,703 | A | | 11/2000 | Crelier ........................... 717/5 |
| 6,158,048 | A | | 12/2000 | Lueh et al. ..................... 717/9 |
| 6,237,077 | B1 | | 5/2001 | Sharangpani et al. ......... 712/24 |
| 6,240,510 | B1 | | 5/2001 | Yeh et al. .................... 712/236 |
| 6,286,135 | B1 | | 9/2001 | Santhanam ..................... 717/9 |
| 6,301,705 | B1 | * | 10/2001 | Doshi et al. ................ 717/154 |
| 6,308,318 | B1 | * | 10/2001 | Krishnaswamy ............ 717/139 |
| 6,311,325 | B1 | | 10/2001 | Levine et al. ................... 717/4 |
| 6,317,872 | B1 | | 11/2001 | Gee et al. ....................... 717/7 |
| 6,317,876 | B1 | | 11/2001 | Kunz et al. ..................... 717/9 |
| 6,324,687 | B1 | | 11/2001 | Beadle et al. ................... 717/6 |
| 6,336,213 | B1 | | 1/2002 | Beadle et al. ................... 717/5 |
| 6,339,841 | B1 | | 1/2002 | Merrick et al. ............... 717/10 |
| 6,385,660 | B1 | | 5/2002 | Griesemer et al. .......... 709/315 |
| 6,408,433 | B1 | | 6/2002 | Click, Jr. et al. ............ 717/154 |
| 6,412,105 | B1 | | 6/2002 | Maslennikov et al. ......... 717/9 |
| 6,427,234 | B1 | | 7/2002 | Chambers et al. ........... 717/140 |
| 6,466,972 | B1 | | 10/2002 | Paul et al. .................... 709/222 |
| 6,487,601 | B1 | | 11/2002 | Hubacher et al. ........... 709/229 |
| 6,507,946 | B1 | | 1/2003 | Alexander, III et al. .... 717/145 |
| 6,513,109 | B1 | * | 1/2003 | Gschwind et al. .......... 712/200 |
| 6,539,473 | B1 | | 3/2003 | Hubacher et al. .............. 713/2 |
| 6,567,974 | B1 | | 5/2003 | Czajkowski ................. 717/151 |
| 6,571,385 | B1 | | 5/2003 | Muthukumar et al. ...... 717/150 |
| 6,604,167 | B1 | | 8/2003 | Blandy et al. ............... 711/100 |
| 6,615,403 | B1 | * | 9/2003 | Muthukumar et al. ...... 717/160 |
| 6,622,238 | B1 | * | 9/2003 | Benjamin et al. ........... 712/226 |
| 6,640,313 | B1 | | 10/2003 | Quach .......................... 714/10 |
| 6,640,315 | B1 | * | 10/2003 | Hwu et al. .................... 717/17 |
| 6,658,551 | B1 | | 12/2003 | Berenbaum et al. .......... 712/24 |
| 6,675,375 | B1 | | 1/2004 | Czajkowski ................. 717/151 |

OTHER PUBLICATIONS

Azevedo et al., "Java Annotation–Aware Just–In–Time (AJIT) Compilation System", ACM 1999, San Francisco, CA, USA, pp. 142–151.

Larus et al., "SPIM S20: A MIPS R2000 Simulator", Computer Sciences Department, University of Wisconsin, Madison, copyright 1990–1997, pp. 1–25.

Aho et al., "Compilers: Principles, Techniques, and Tools", copyright 1986, Bell Telephone Labs, Inc., 4 pages.

Fernandez, "Simple and Effective Link–Time Optimization of Modula–3 Programs", Nov. 7, 1997, pp. 1–7.

Ishizaki et al., Design, Implementation, and Evaluation of Optimizations in a Just–In–Time Complier, ACM, Jun. 1999, pp. 119–122.

Sinclair et al., "ASIC Design for Conditional Nested Loops with Predicate Registers", Aug. 11, 1999, Circuits and Systems, 1999, $42^{nd}$ Midwest Symposium, vol. 2, pp. 874–877.

"The Java Virtual Machine Specification", Sun Microsystem, Inc., copyright 1997, http://java.sun.com/docs/books/vmspec/html/Instructions2.doc14.html.

* cited by examiner

APPARATUS AND METHOD FOR DETECTING AND HANDLING EXCEPTIONS

RELATED APPLICATIONS

The present invention is related to commonly assigned and co-pending U.S. patent application Ser. No. 09/671,876 entitled "APPARATUS AND METHODS FOR IMPROVED DEVIRTUALIZATION OF METHOD CALLS", Ser. No. 09/671,973 entitled "APPARATUS AND METHOD FOR IMPLEMENTING SWITCH INSTRUCTIONS IN AN IA64 ARCHITECTURE", Ser. No. 09/671,770 entitled "APPARATUS AND METHOD FOR AVOIDING DEADLOCKS IN A MULTITHREADED ENVIRONMENT", Ser. No. 09/671,771 entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,873 entitled "APPARATUS AND METHOD FOR AN ENHANCED INTEGER DIVIDE IN AN IA64 ARCHITECTURE", Ser. No. 09/671,874 entitled "APPARATUS AND METHOD FOR CREATING INSTRUCTION GROUPS FOR EXPLICITLY PARALLEL ARCHITECTURES", and Ser. No. 09/671,875 entitled "APPARATUS AND METHOD FOR CREATING INSTRUCTION BUNDLES IN AN EXPLICITLY PARALLEL ARCHITECTURE", filed on even date herewith and hereby incorporated by reference.

BACKGROUND OF THE INVENTION

1. Technical Field

The present invention is directed to an apparatus and method for detecting and handling software exceptions such as those thrown in Java and C++. More particularly, the present invention is directed to an apparatus and method for detecting and handling software exceptions in a machine having predication and explicit parallelism.

2. Description of Related Art

When a software exception is thrown, normal program flow is altered and an exception handler is invoked. Exceptions are typically thrown when an error or other exceptional condition is encountered. This tends to be a rare occurrence for most applications. However, to ensure that thrown exceptions are properly caught it may be necessary to check for their presence frequently. For example, a typical implementation of the Java Virtual Machines will include a check for a pending exception after each method invocation. Furthermore, some applications may use exception throwing as a common flow control device. For these applications, the efficient handling of exceptions is critical to their performance. Therefore, it would be beneficial to have an apparatus and method of efficiently detecting and handling exceptions. It would further be beneficial to have an apparatus and method for efficiently detecting and handling exceptions in a machine having predication and explicit parallelism.

SUMMARY OF THE INVENTION

An apparatus and method are provided for detecting and handling exceptions. The apparatus and method make use of predicate registers to identify whether or not an exception is pending. Instructions that are executed only when there is an exception pending are qualified by a first predicate register in the predicate register pair. Instructions that are executed only when there is no exception pending are qualified based on a second predicate register in the predicate register pair.

When an application or system is initialized, the predicate pair is set to indicate that no exception is pending, i.e. the first predicate is set to zero and the second is set to one. When an exception is thrown, the settings of the predicate pair is reversed thereby indicating the presence of a pending exception.

Whenever an exception must be detected, a branch instruction qualified by the first of the predicate pair is inserted into the instruction group at the site where detection is required. All instructions in the instruction group that precede the inserted branch are qualified by the second predicate. In this way, the standard instructions of the group will be executed when no exception is pending but only the inserted branch instruction will be executed when an exception is pending.

The target of the inserted branch depends on whether an exception handler is provided to handle exceptions at the detection site. If not the branch will target code that terminates the current method and returns to the method's caller. Otherwise the branch will target code that will invoke a lookup handler routine passing it parameters that identify the detection site. The lookup handler routine will determine if any of the exception handler(s) associated with the detection site handles the current pending exception. If so control will be passed to the handler. If not the current method will be terminated and a return will be made to its caller. Other features and advantages of the present invention will be described in, or will become apparent to those of ordinary skill in the art in view of, the following detailed description of the preferred embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
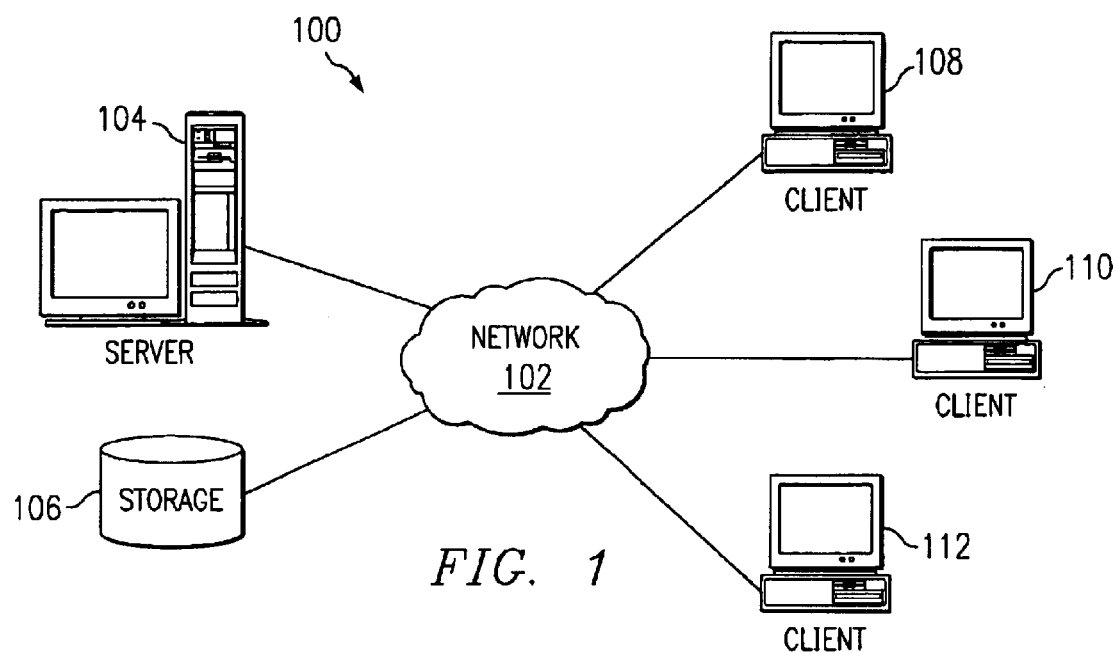
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
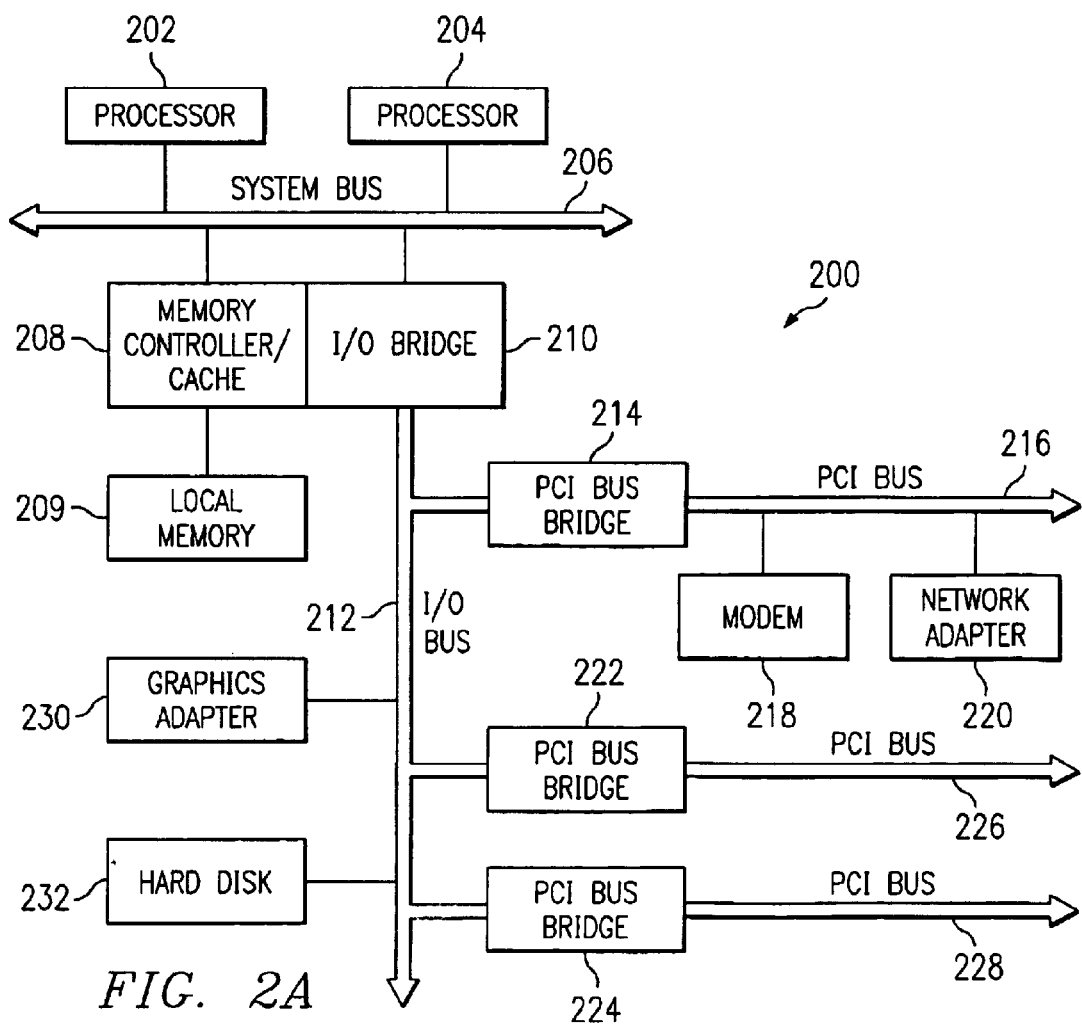
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
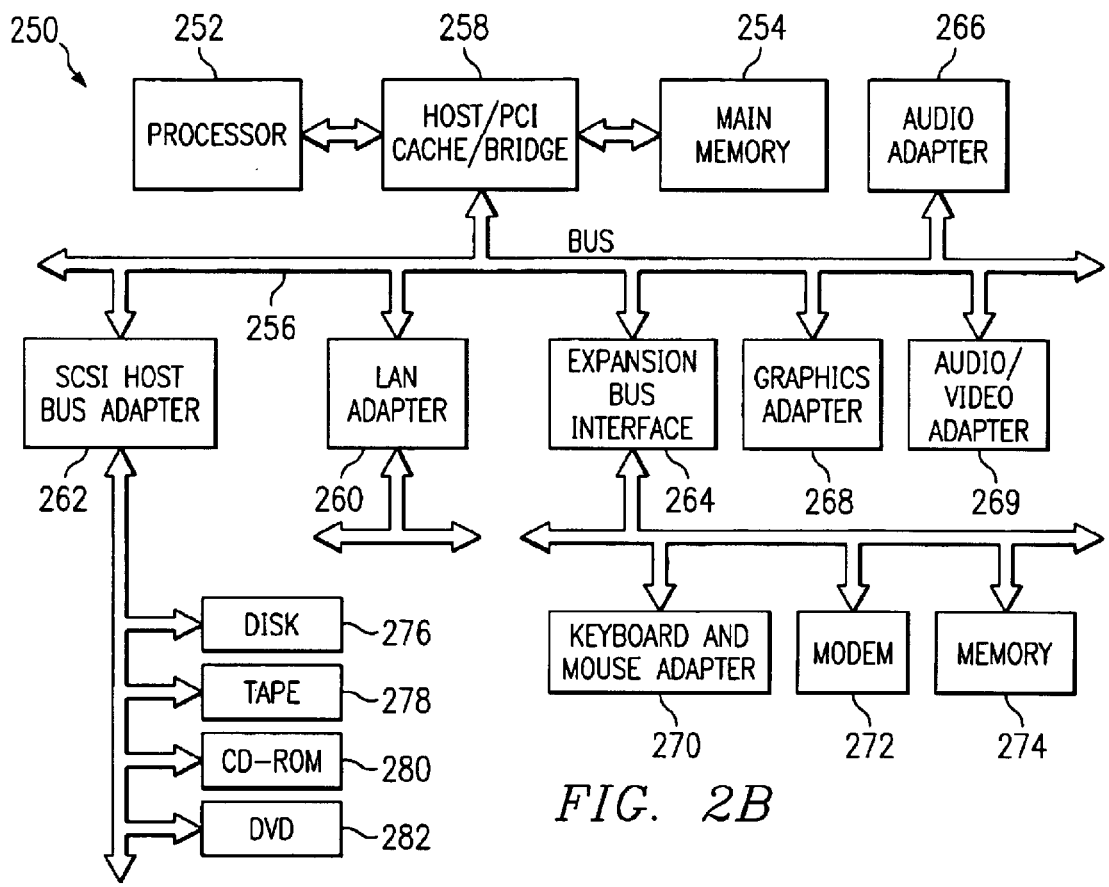
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 256 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as OS/2, which is available from International Business Machines Corporation.

An object oriented programming system such as Java may run in conjunction with the operating system and may provide calls to the operating system from Java programs or applications executing on data processing system 250. Instructions for the operating system, the object oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for detecting and handling exceptions in a machine having predication and explicit parallelism. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
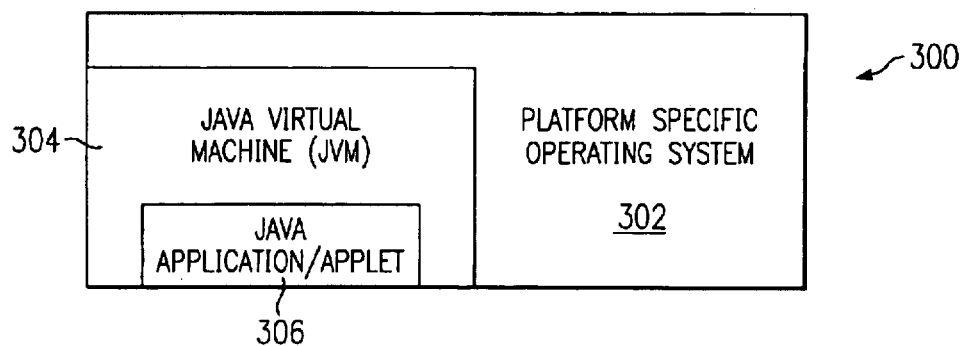
FIG. 3A is a block diagram illustrates the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a Just-In-Time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs may interpret bytecodes or use other techniques, such as Just-In-Time compiling, to execute bytecodes. It is not uncommon for a JVM to interpret some methods and Just-In-Time compile others.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically liked library whose exact form is platform specific.

Figure 3B:
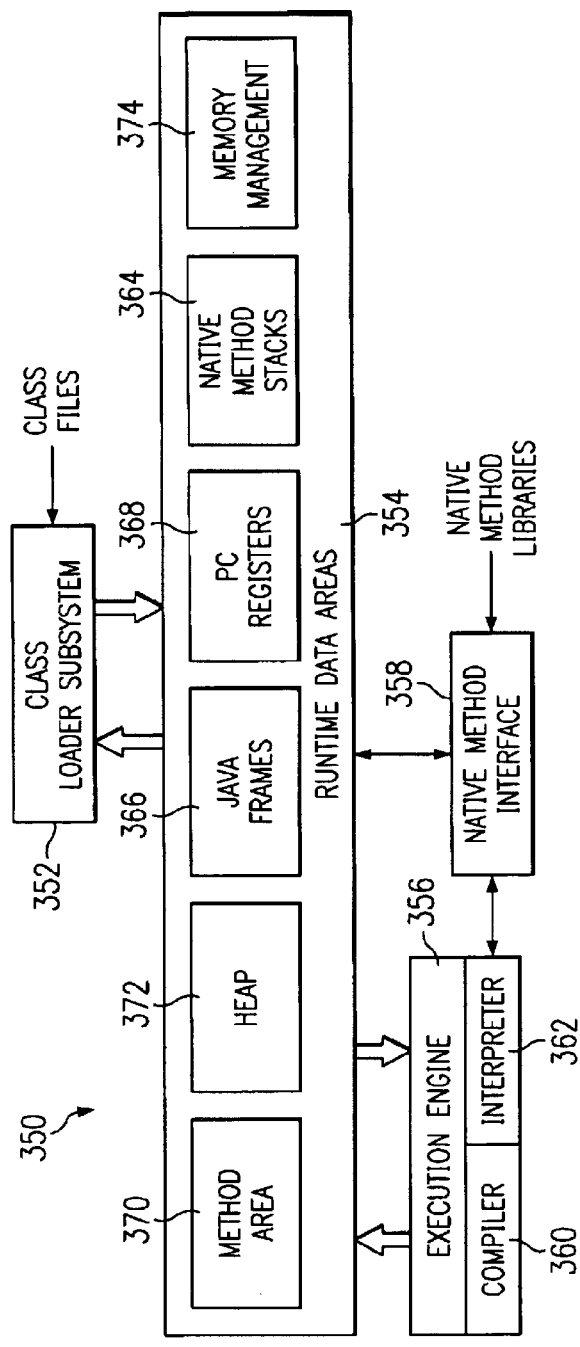
FIG. 3B is an exemplary block diagram of a Java Virtual Machine (JVM) according to the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java frames 366, PC registers 368, method area 370, and heap 372. These different data areas represent the organization of memory needed by JVM 350 to execute a program.

Java frames 366 are used to store the state of Java method invocations. When a new thread is launched, the JVM creates a new Java stack from which the thread will allocate Java Frames. A thread is a part of a program, i.e. a transaction or message, that can execute independently of other parts. In a multithreaded environment, multiple streams of execution may take place concurrently within the same program, each stream processing a different transaction or message.

A Java frame contains all the information pertaining to a single method invocation and is commonly partitioned into three regions. The first region holds all local variables including the input parameters. The second region is typically fixed in size and contains various pointers used by the interpreter including a pointer to the previous frame. The third region is the Java operand stack which is a FIFO stack that holds operands and results of bytecode operations. The operand stack is also used to pass parameters during invocation. The JVM performs only two operations directly on Java operand stacks: it pushes and pops stack items. These items may be object references or primitives such as integers or floating point values.

When the interpreter 362 invokes a Java method, the interpreter 362 saves the return PC, i.e. a bytecode pointer, in the current frame and makes an indirect call via a JVM invoker field in a method block of the Java method, as described in greater detail hereafter. Upon return from the JVM invoker, the interpreter fetches the current frame and resumes execution starting with the bytecode specified in the returnPC field. When an interpreted method completes, the current frame is discarded and the previous frame is made current.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java frames 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The present invention is equally applicable to either a platform specific environment, i.e. a traditional computer application environment loading modules or native methods, or a platform independent environment, such as an interpretive environment, e.g., a Java environment loading classes, methods and the like. For purposes of explanation of the features and advantages of the present invention, examples of the operation of the present invention will assume a Java environment.

The present invention provides a mechanism by which exceptions in a machine having predication and explicit parallelism are detected and handled. In particular, the present invention may operate in a non-Mixed-Mode-Interpretation (non-MMI) Just-In-Time (JIT) compiler running in a Java Virtual Machine (JVM) on an IA64 platform. MMI describes an environment where methods are initially interpreted until they pass some threshold, such as a frequency of invocation or time consumed, at which time they are compiled. In a non-MMI environment, all methods are compiled. It should be appreciated, however, that the present invention is not limited to a non-MMI environment and may be implemented in MMI environments without departing from the spirit and scope of the present invention.

The IA64 platform is described in the Intel IA-64 Architecture Software Developer's Manual, available for download at http://developer.intel.com/design/ia-64/downloads/24531702s.htm, which is hereby incorporated by reference in its entirety. Briefly, IA64 allows a compiler or programmer to explicitly group instructions to be executed concurrently. IA64 also provides a set of 64 single bit predicate registers which can be used to control instruction execution. A predicated register can be associated with an instruction as a "qualifying predicate." When the qualifying predicate is true, the instruction executes normally. When the qualifying predicate is false, the instruction will not modify architectural state thereby acting essentially as a no-operation (a NOP).

With the present invention, a pair of predicate registers P1 and P2 is utilized to determine if an exception is pending or not. In the case of the present invention, P1 is true when an exception is pending and is false otherwise. P2 is true when no exception is pending and false otherwise. The values of predicate registers are set by the results of instructions, such as compare (cmp) and test bit (tbit).

The present invention provides methods for using these predicate registers to detect and handle exceptions. In particular, the present invention provides a method for initializing the predicate register pair when crossing a boundary from non-JITted code to JITted code, a method for setting the predicate pair to indicate the presence of a pending exception, a method for running exception detecting instructions concurrently with instructions that are only allowed to complete if no exception is present, and a method to pass control to the appropriate exception handler when an exception occurs.

As mentioned above, the present invention includes a method for initializing a predicate register pair for use in exception detecting and handling when crossing a boundary from non-JITted code to JITted code. With the method of the present invention, when invoking a JITted method from non-JITted code, e.g., a native method or the JVM itself, a "glue" routine is used to set up the required environment, such as setting up input registers and various flags. A "glue" routine is a routine that is used to perform some conversion, translation or other process that makes one system work with another. In this case, the glue routine operates to allow a Java Virtual Machine and a Just-In-Time compiler to work together.

The glue routine of the present invention also sets the predicate register pair by examining an exception flag maintained by the JVM. If the exception flag in the JVM indicates that an exception occurred, the predicate registers are set to indicate an exception. In other words, P1 is set to true and P2 is set to false.

In addition, when returning to JITted code from non-JITted code, e.g., returning from a call into the JVM, small "glue" routines are executed to restore the state required by the JITted environment. If the call could have caused an exception to be thrown, the predicate register pair is set again, via examination of the exception flag, before returning to JITted code. When JITted code throws an exception, a routine is called which sets up storage locations to indicate the pending exception and additionally sets the predicate register pair to indicate the presence of the exception, i.e. P1 is set to true and P2 is set to false.

When the JIT compiler generates instructions following a method invocation, it is free to combine, in a single instruction group, instructions that must only execute in the presence of an exception with those which must only execute in the absence of an exception. Those instructions that must execute only when no exception is pending are qualified by predicate register P2 while the instructions that must execute when an exception is pending are qualified by predicate register P1. By "qualified" what is meant is that the predicate register is a qualifying predicate, i.e. the predicate register is one whose value determines whether the processor commits the results computed by the instruction.

In a preferred embodiment, only a single branch instruction is used to handle the exception so that the code might appear as:

```
(P2)    ld      r14=[r35]
(P2)    mov     r37=r8
(P2)    adds    r9=8, r8
(P1)    br.cond.spnt  handleException
```

For each method that handles exceptions, an exception table indicates all try and catch blocks. Each entry of the table identifies a range of bytecodes that represents the try phase and a bytecode offset that represents the start of the exception handler. Each entry also includes an identification of what type of exception is handled and provides an auxiliary pointer field available for JIT compiler use. This auxiliary pointer field, in the present invention, is used to point to the compiled code representing the exception handler. For example, an entry in an exception table may take the form of:

StartPC EndPC HandlerPC ExceptionType wordForJit

If an invoke is not in a try range, the JIT compiler will generate the predicate register P1 qualified branch to go to an appropriate return stub. The collection of return stubs is placed so that they can be reached by a relative branch from any JITted method and are replicated if required.

Figure 4:
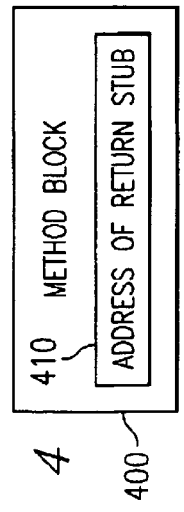
FIG. 4 is an exemplary block diagram illustrating a method block in accordance with the present invention.

FIG. 4 is an exemplary block diagram of a method block in accordance with the present invention. The method block 400 is a control block data structure used to represent control parameters of a Java method. The method block 400 has a number of fields including fields 410 for storing the address of return stubs for the method associated with the method block. The return stubs are pieces of code that perform a type of return to an invoking, or calling, routine. Such returns may include, for example, standard returns, synchronized returns, returns for saving floating point registers, and the like, as is generally known in the art. An example of a standard return stub may be:

```
mov     ar.pfs = r35
mov     rp = r36
br.ret  rp
```

An example of a synchronized return stub may be:

```
mov     ar.pts = r35
mov     rp = r36
br.cond MonitorExit
```

Figure 5:
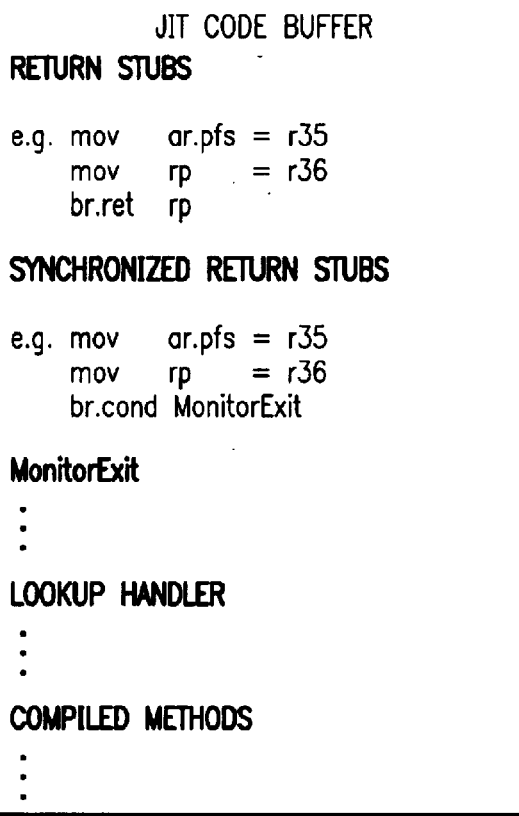
FIG. 5 is an exemplary block diagram illustrating a Just-In-Time (JIT) code buffer.

When a method is JITted, the results of the JIT compiler are stored in a JIT code buffer for use. FIG. 5 is an exemplary block diagram illustrating a JIT code buffer in accordance with the present invention. As shown in FIG. 5, the JIT code buffer 500 stores the return stubs for the methods, the lookup handler and compiled methods. The JIT code buffer 500 may be of various sizes but is typically 16 MB in size. Of these 16 MB, less than 4 k is used to store the returns stubs and lookup handler. The remainder of the JIT code buffer 500 is used to store the compiled methods.

The compiled JITted methods may make use of the return stubs stored in the JIT code buffer 500 during exception handling. Exception handling is performed using the lookup handler which either invokes the compiled method exception handler or passes control to the return stubs in the JIT code buffer 500.

The stubs perform whatever return function is required of the method, including monitor release for synchronized methods. The return stubs perform a "pure" return as is required for exception handling. This provides complete freedom to the JIT compiler when creating standard return sequences that will be used for non-exception returns. For example, a standard return could contain conditional storage modifications that would not be allowed when an exception was present.

With the present invention, if an exception is encountered, and the exception is within a try block of the method, the JIT compiler creates a branch to a "snippet," which is code generated specifically for that method. The snippet identifies a known register with the bytecode offset of an invoke that branches to a lookup handler. An example snippet is:

```
mov     r8 = pc
movl    r9 = currentMethodBlock
br.cond LookupHandler
```

The lookup handler searches the method's exception table to see if the bytecode offset is within the range of a try block which handles the current instructions. If it is, the predicates are reset to indicate no pending exception and control is passed to the compiled exception handler for the method. Otherwise, a branch is made to the return stub appropriate for this method with the predicate registers indicating a pending exception.

In this way, methods that do not handle the current exception return to the calling routine with P1=true and P2=false. The post invoke code for that call is executed and the appropriate return stub or snippet is invoked until the exception is handled. If the exception is not handled by any method in the call chain, the JVM terminates the thread and prints a stack trace identifying the exception.

Figure 6:
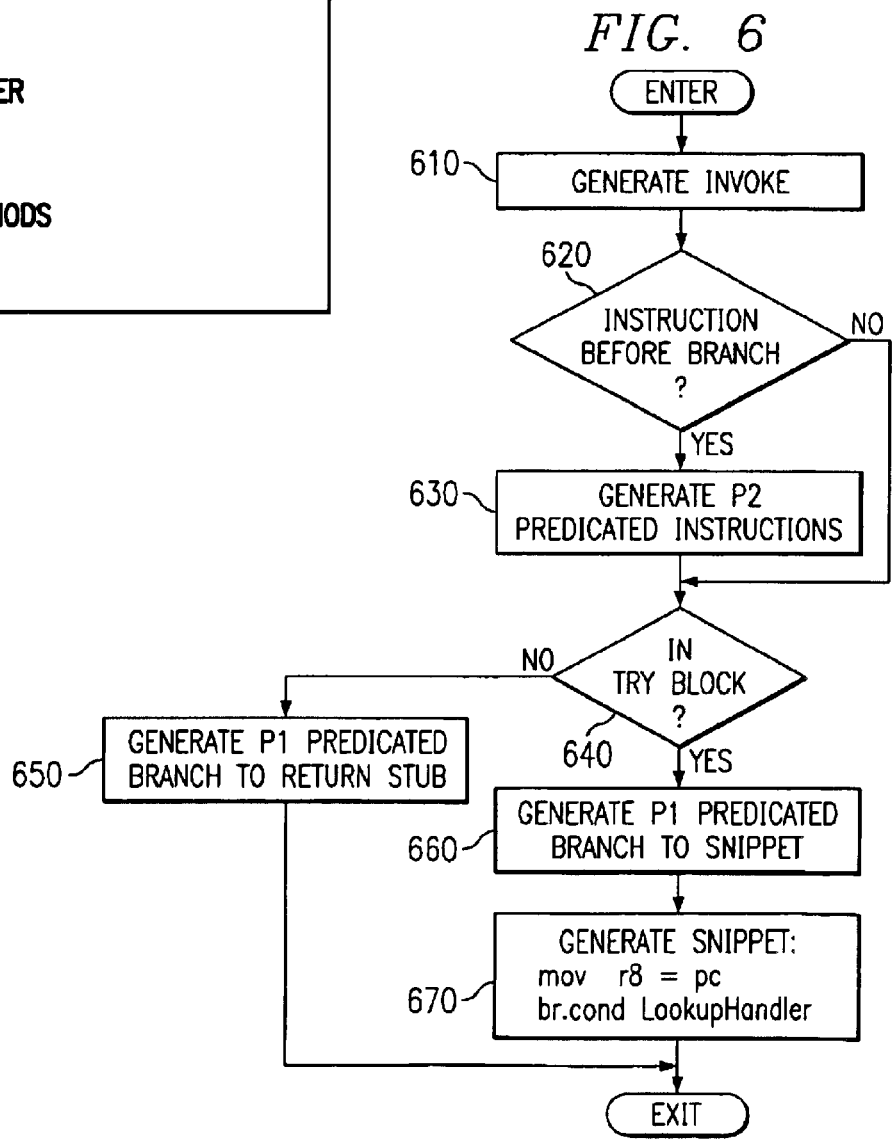
FIG. 6 is a flowchart outlining an exemplary operation of the present invention.

FIG. 6 is a flowchart outlining an exemplary operation of the present invention. As shown in FIG. 6, the operation starts with an invoke instruction for invoking a method being generated by the compiler (step 610). A determination is made as to whether there are instructions before the exception branch (step 620).

If there are instructions before the exception branch, the predicate register P2 predicated instructions are generated (step 630). Thereafter, or if there are no instructions before the exception branch, a determination is made as to whether or not the instruction is in a try block, or range, of the method (step 640). If not, the predicate register P1 predicated instructions to branch to a return stub for the method is generated (step 650). If the instruction is in a try block, the predicate register P1 predicated instruction to branch to a snippet associated with the method is generated (step 660). The snippet is then generated (step 670).

Figure 7:
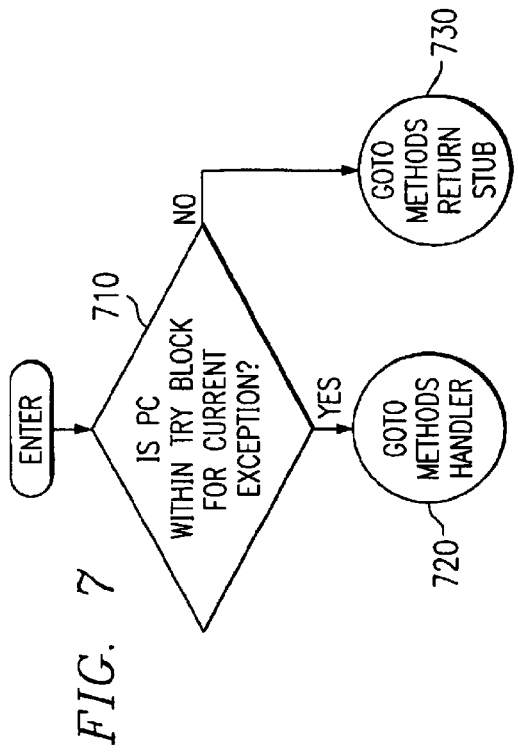
FIG. 7 is a flowchart outlining an exemplary operation of a lookup handler.

FIG. 7 is a flowchart outlining an exemplary operation of the lookup handler of the present invention. As shown in FIG. 7, the operation involves determining if the pc, i.e.

bytecode pointer, for a current exception is within a try block (step 710). This operation may involve using the exception table for the method to determine if the exception is handled by the method exception handler. If so, the lookup handler invokes the compiled method exception handler (step 720). If not, the lookup handler invokes an appropriate return stub for the method (step 730).

Thus, the present invention provides methods for using predicate registers to detect and handle exceptions. In particular, the present invention provides a method for initializing the predicate register pair when crossing a boundary from non-JITted code to JITted code, a method for setting the predicate pair to indicate the presence of a pending exception, a method for running exception detecting instructions concurrently with instructions that are only allowed to complete if no exception is present, and a method to pass control to the appropriate exception handler when an exception occurs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process of handling exceptions in a device having predication, comprising:

determining if an exception is pending based on values of a predicate register pair, wherein the predicate register pair includes two single bit predicate registers; and handling the exception when it is determined that an exception is pending, wherein handling the exception includes determining if an instruction in a method that threw the exception is in a try block and invoking a snippet associated with the method.

2. The process of claim 1, wherein determining if an exception is pending includes determining if a value of a first predicate register is true and a second predicate register is false.

3. The process of claim 1, wherein if the address of the instruction is not in the try block, handling the exception includes invoking a return associated with the method.

4. The process of claim 3, wherein if the exception is in the try block, using an associated exception handler for the method.

5. The process of claim 1, wherein the device has an IA64 architecture.

6. The process of claim 1, wherein the snippet invokes a lookup handler for determining if the exception is within the try block of the method.

7. The process of claim 6, wherein the lookup handler determines if the exception is within the try block of the method by searching an exception table associated with the method and determining if an address of the instruction is within the exception table.

8. An apparatus for handling exceptions in a device having predication, comprising:

means for determining if an exception is pending based on values of a predicate register pair, wherein the predicate register pair includes two single bit predicate registers; and means for handling the exception when it is determined that an exception is pending, wherein the means for handling the exception determines if an instruction in a method that threw the exception is in a try block and invokes a snippet associated with the method.

9. The apparatus of claim 8, wherein the means for determining if an exception is pending determines if a value of a first predicate register is true and a second predicate register is false.

10. The apparatus of claim 8, wherein if the address of the instruction is not in the try block, the means for handling the exception invokes a return associated with the method.

11. The apparatus of claim 10, wherein if the exception is in the try bock, the means for handling the exception uses an associated exception handler for the method.

12. The apparatus of claim 8, wherein the apparatus has an IA64 architecture.

13. The apparatus of claim 8, wherein the snippet invokes a lookup handler for determining if the exception is within the try block of the method.

14. The apparatus of claim 13, wherein the lookup handler determines if the exception is within the try block of the method by searching an exception table associated with the method and determining if an address of the instruction is within the exception table.

15. A computer program product in a computer readable medium for handling exceptions in a device having predication, comprising:

first instructions for determining if an exception is pending based on values of a predicate register pair, wherein the predicate register pair includes two single bit predicate registers; and second instructions for handling the exception when it is determined that the exception is pending, wherein the second instructions for handling the exception include instructions for determining if an instruction in a method that threw the exception is in a try block and instructions for invoking a snippet associated with the method.

16. The computer program product of claim 15, wherein the first instructions for determining if an exception is pending include instructions for determining if a value of a first predicate register is true and a second predicate register is false.

17. The computer program product of claim 15, wherein the second instructions for handling the exception include instructions for invoking a return associated with the method if the address of the instruction is not in the try block.

18. The computer program product of claim 17, wherein the second instructions further include instructions for using an associated exception handler for the method if the exception is in the try block.

19. The computer program product of claim 15, wherein the device has an IA64 architecture.

20. The computer program product of claim 15, wherein the snippet invokes a lookup handler for determining if the exception is within the try block of the method.

21. The computer program product of claim 20, wherein the lookup handler determines if the exception is within the try block of the method by searching an exception table associated with the method and determining if an address of the instruction is within the exception table.

* * * * *